Dec. 1, 1959        H. J. FLAIR        2,914,861
ANALYTICAL GEAR COMPARATOR
Filed Oct. 1, 1953        10 Sheets-Sheet 1

INVENTOR.
Henry J. Flair
BY
Olson & Trexler
attys.

Dec. 1, 1959  H. J. FLAIR  2,914,861
ANALYTICAL GEAR COMPARATOR
Filed Oct. 1, 1953  10 Sheets-Sheet 5

INVENTOR.
Henry J. Flair
BY Olson & Trexler
attys.

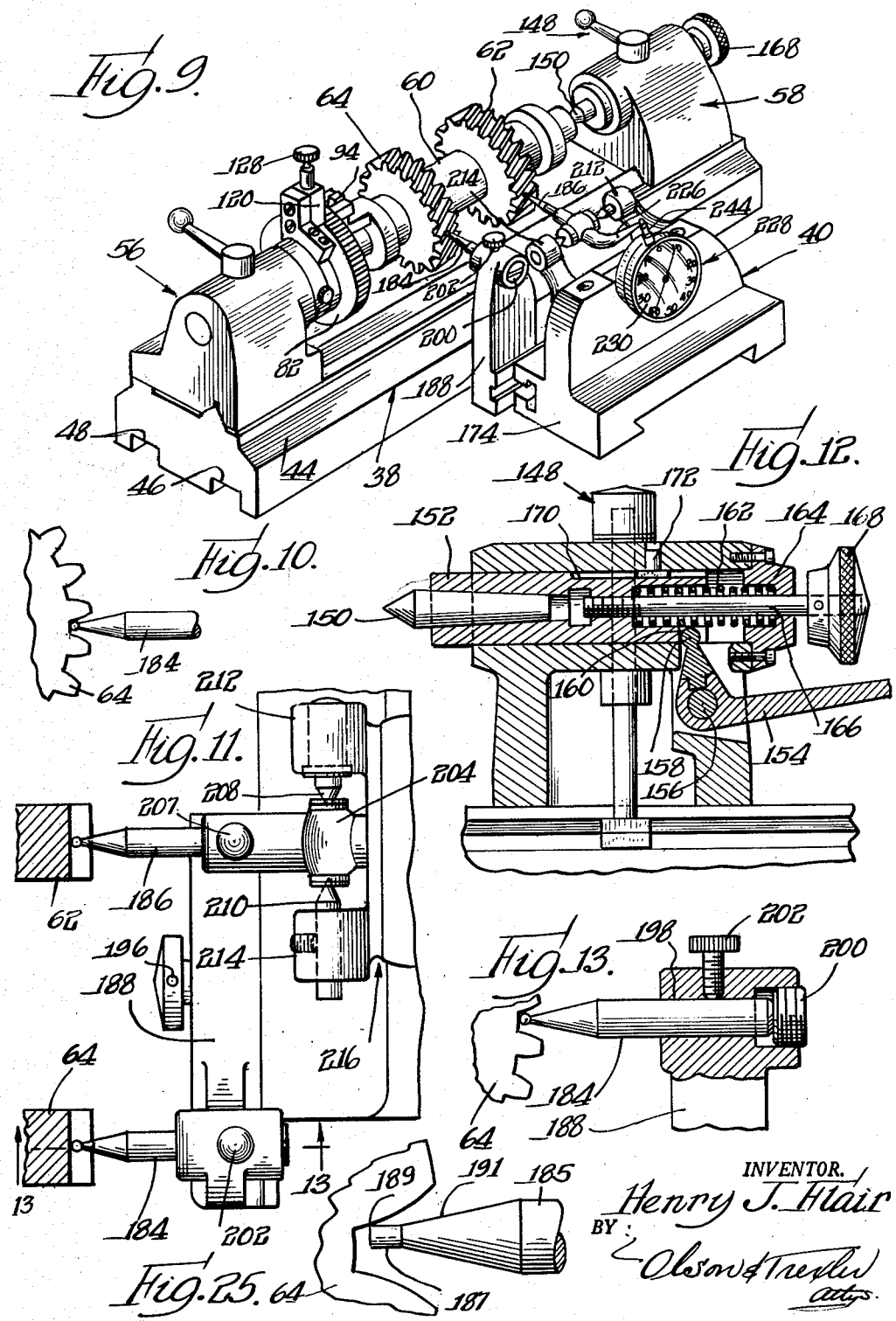

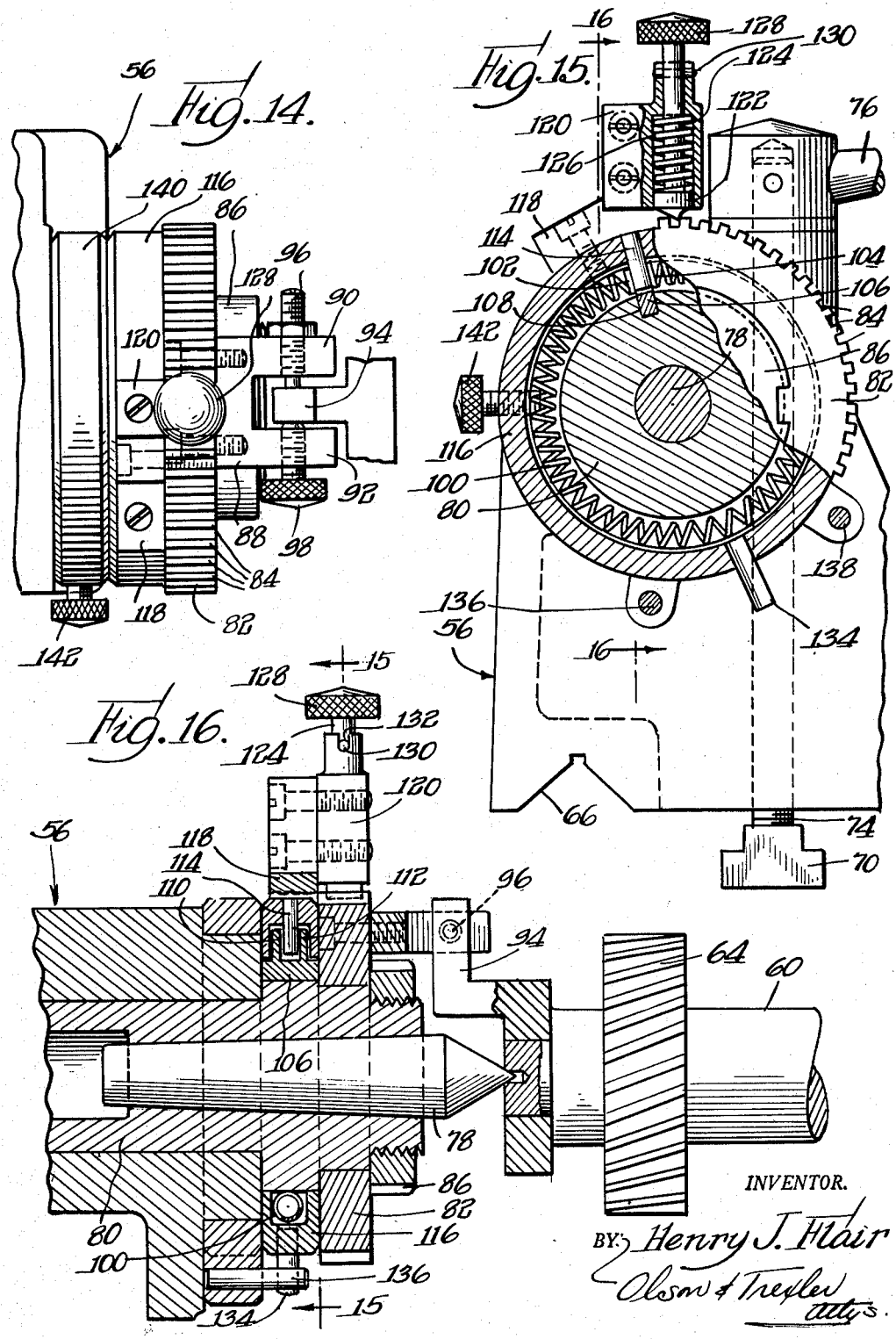

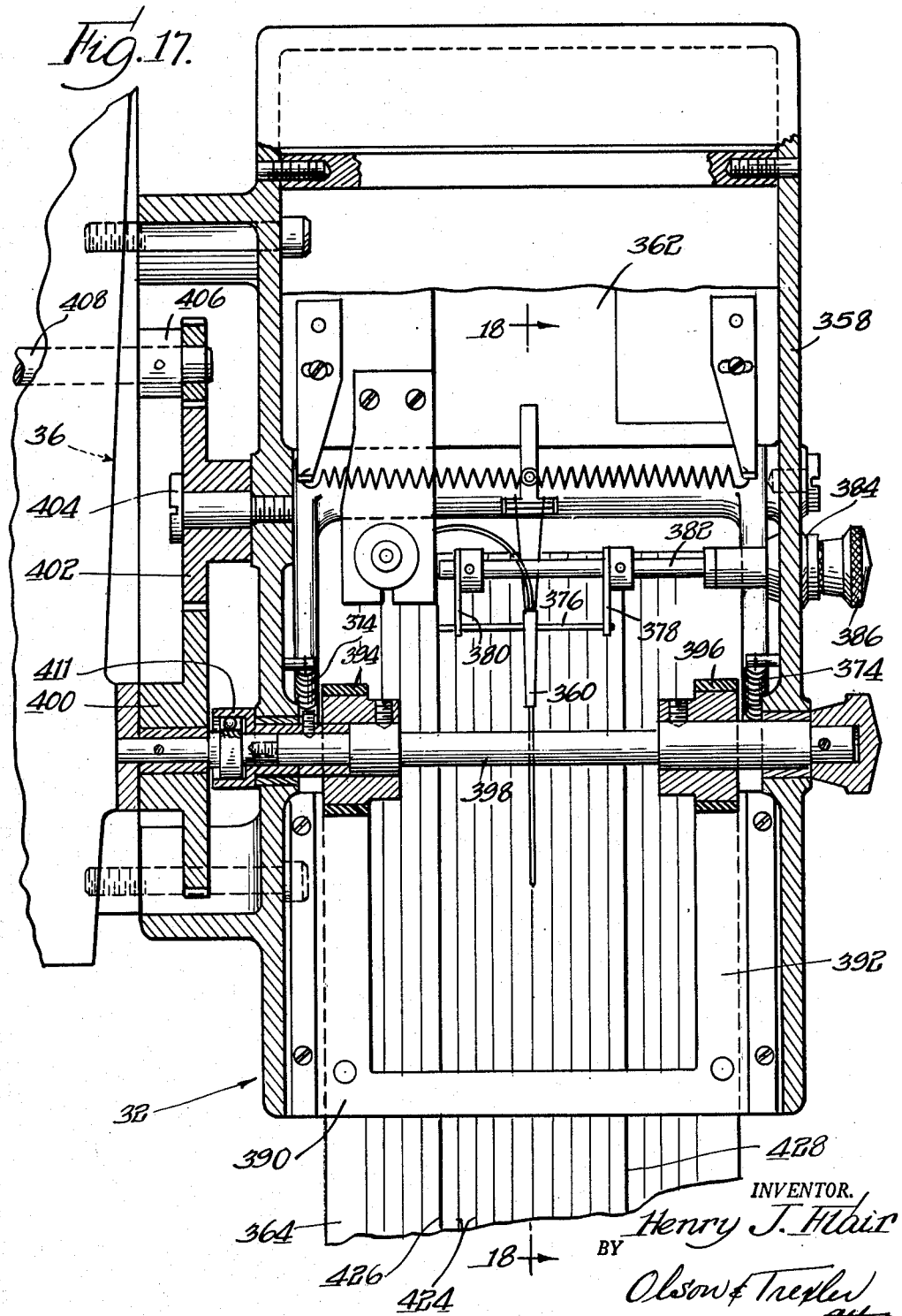

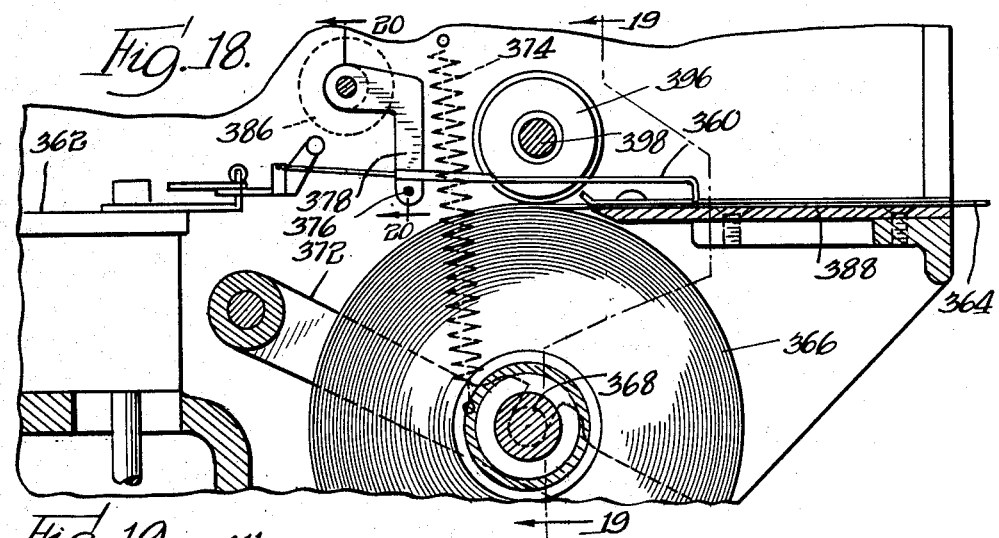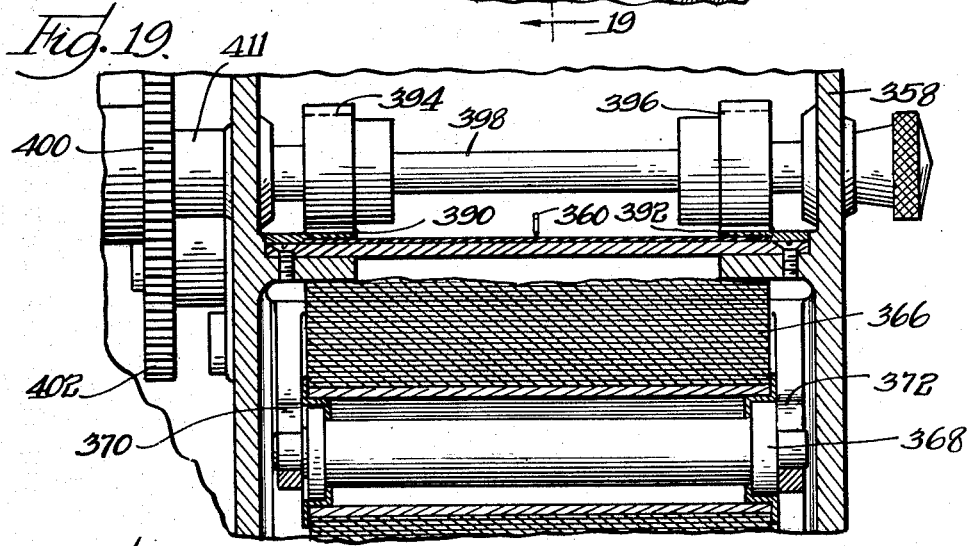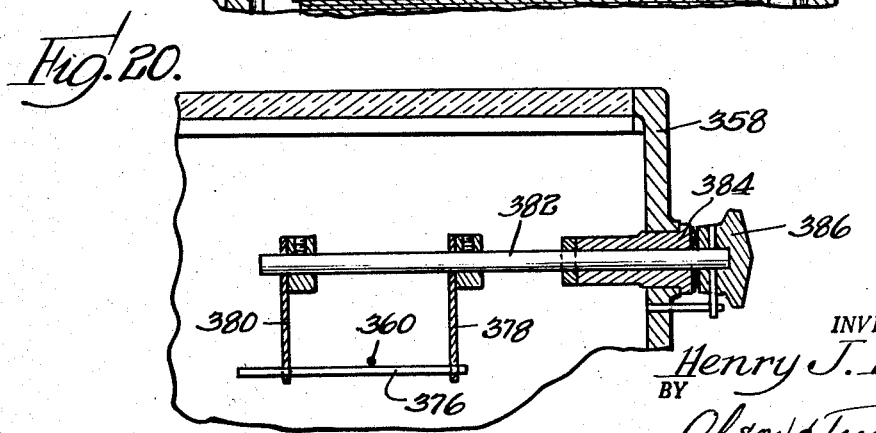

Dec. 1, 1959 H. J. FLAIR 2,914,861
ANALYTICAL GEAR COMPARATOR
Filed Oct. 1, 1953 10 Sheets-Sheet 10

INVENTOR.
Henry J. Flair
BY
Olson & Trexler
attys.

United States Patent Office 2,914,861
Patented Dec. 1, 1959

2,914,861

ANALYTICAL GEAR COMPARATOR

Henry J. Flair, Chicago, Ill., assignor to Illinois Tool Works, Chicago, Ill., a corporation of Illinois Application October 1, 1953, Serial No. 383,684

14 Claims. (Cl. 33—179.5)

The present invention relates to a novel apparatus for the checking or testing of gears and the like, and more particularly to a novel analytical type testing apparatus.

In order to satisfy the present day high requirements for performance, it has been necessary to devise means for accurately and analytically testing or inspecting gears and like work pieces for the maintenance of high standards of accuracy and quality in the gears. Gears are usually inspected by measuring errors in lead, tooth profile, and tooth spacing. However, analytical inspecting machines suggested heretofore have usually been capable of checking only one of these elements so that three machines are required to measure the elements of lead, profile, and tooth spacing. The relatively high cost of providing three machines for testing a gear is obviously undesirable, and, in addition, a relatively large amount of floor space is required to accommodate the three machines. Furthermore, in order to obtain economical inspection, it is desirable to locate the testing machine in the shop adjacent the gear cutting or shaving apparatus, and in many instances, gear inspection machines of the analytical type have been insufficiently rugged to permit them to be located in the shop, and they have, therefore, been located in a gear testing laboratory. This requires excess and uneconomical handling of the gears or like work pieces since the gears must be transported from the shop to the laboratory.

Another important disadvantage of certain analytical and inspection machines used to measure the element of tooth spacing is that the tooth spacing is measured between single points on adjacent tooth profiles. This procedure gives accurate results only in the event that the tooth profiles are held to close tolerances or that errors in the tooth profiles are truly repetitive. Thus, in many instances, an error which appears to be in the tooth spacing will actually be a localized error in the tooth profile.

An object of the present invention is to overcome some of the above mentioned disadvantages of the prior art by providing a novel analytical testing apparatus capable of measuring errors in the elements of lead, tooth profile, and tooth spacing in a gear or similar work piece.

Another important object of the present invention is to provide an analytical testing apparatus of the above described general type which is capable of indicating the true tooth spacing by combining the inspection of tooth spacing and tooth profile so that localized errors in the tooth profile which affect the apparent tooth spacing measurement may be readily ascertained.

Another object of the present invention is to provide a novel analytical testing apparatus of the above described type, wherein measurements of the elements of lead, tooth profile, and tooth spacing may be permanently recorded on suitable charts, and the elements of tooth profile and tooth spacing may be similarly recorded on a combined chart, whereby the results of the inspection may be readily analyzed by the operator.

Another object of the present invention is to provide an apparatus of the above described type with novel means for comparing a gear or similar work piece with a master gear or element and recording the results of such comparison so that such results are easily readable by the operator.

A more specific object of the present invention is to provide an analytical gear testing machine having inspection fingers or the like engageable with a master element and a work piece with novel means for assuring continuous contact between the master element and work piece and their respective inspection finger means.

Other objects and advantages of the present invention will become apparent from the following description and the drawings, wherein:

Fig. 9 is a somewhat schematic perspective view of portions of the apparatus of this invention;

Fig. 10 is a fragmentary side elevational view illustrating the manner in which the inspecting fingers engage either the master element or the work piece;

Fig. 11 is a fragmentary plan view, showing the inspecting fingers disposed for engagement with the master element and the work piece;

Fig. 12 is a fragmentary vertical cross sectional view taken along line 12—12 in Fig. 3;

Fig. 13 is a fragmentary cross sectional view taken along line 13—13 in Fig. 11;

Fig. 14 is a fragmentary plan view of the novel testing apparatus head stock of this invention;

Fig. 15 is an end view partially broken away of the novel head stock;

Fig. 16 is a fragmentary cross sectional view taken along line 16—16 in Fig. 15 and further showing a work supporting arbor mounted to the head stock;

Fig. 17 is a horizontal cross sectional view taken along line 17—17 in Fig. 2;

Fig. 18 is a fragmentary vertical cross sectional view taken along line 18—18 in Fig. 17;

Fig. 19 is a fragmentary vertical cross sectional view taken along line 19—19 in Fig. 18;

Fig. 20 is a fragmentary cross sectional view taken along line 20—20 in Fig. 18;

Fig. 25 is a fragmentary side elevational view similar to Fig. 10 and showing a novel guide or contact finger which may be used in the apparatus of this invention.

Figure 1:
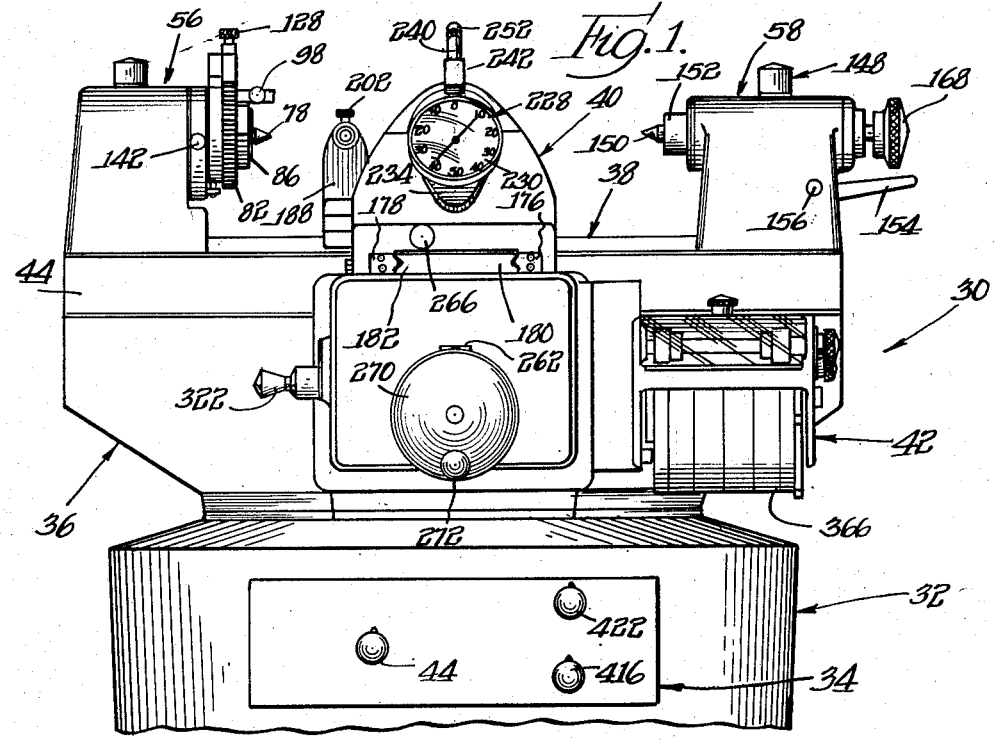
Figs. 1, 2 and 3 are, respectively, a front elevational view, a side elevational view, and a plan view of an apparatus embodying the principles of this invention.
Figure 2:
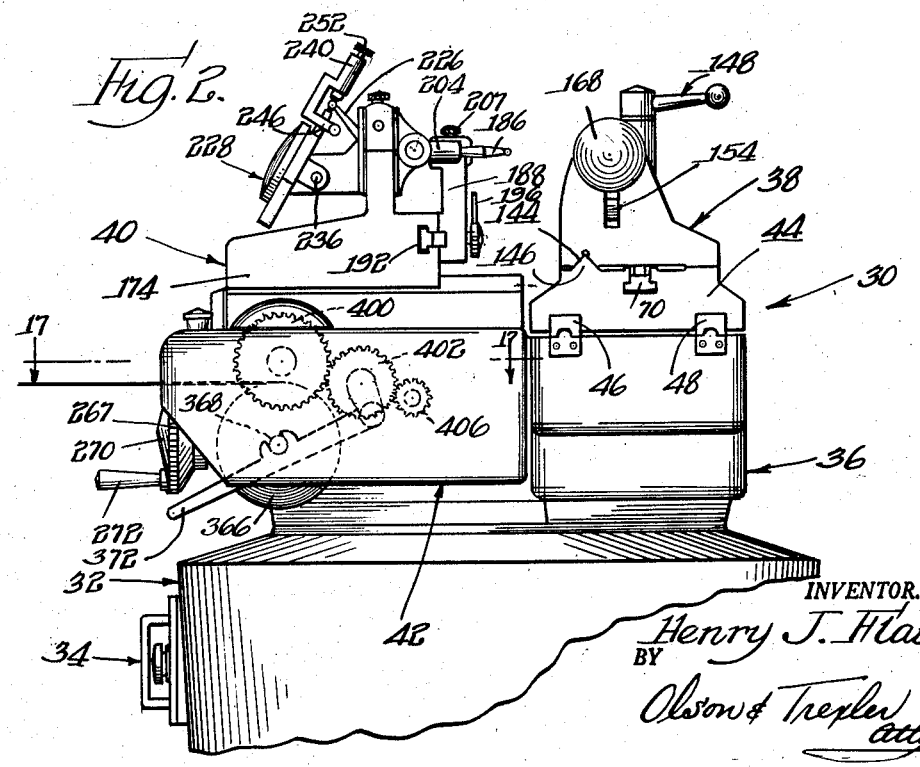
Figure 3:
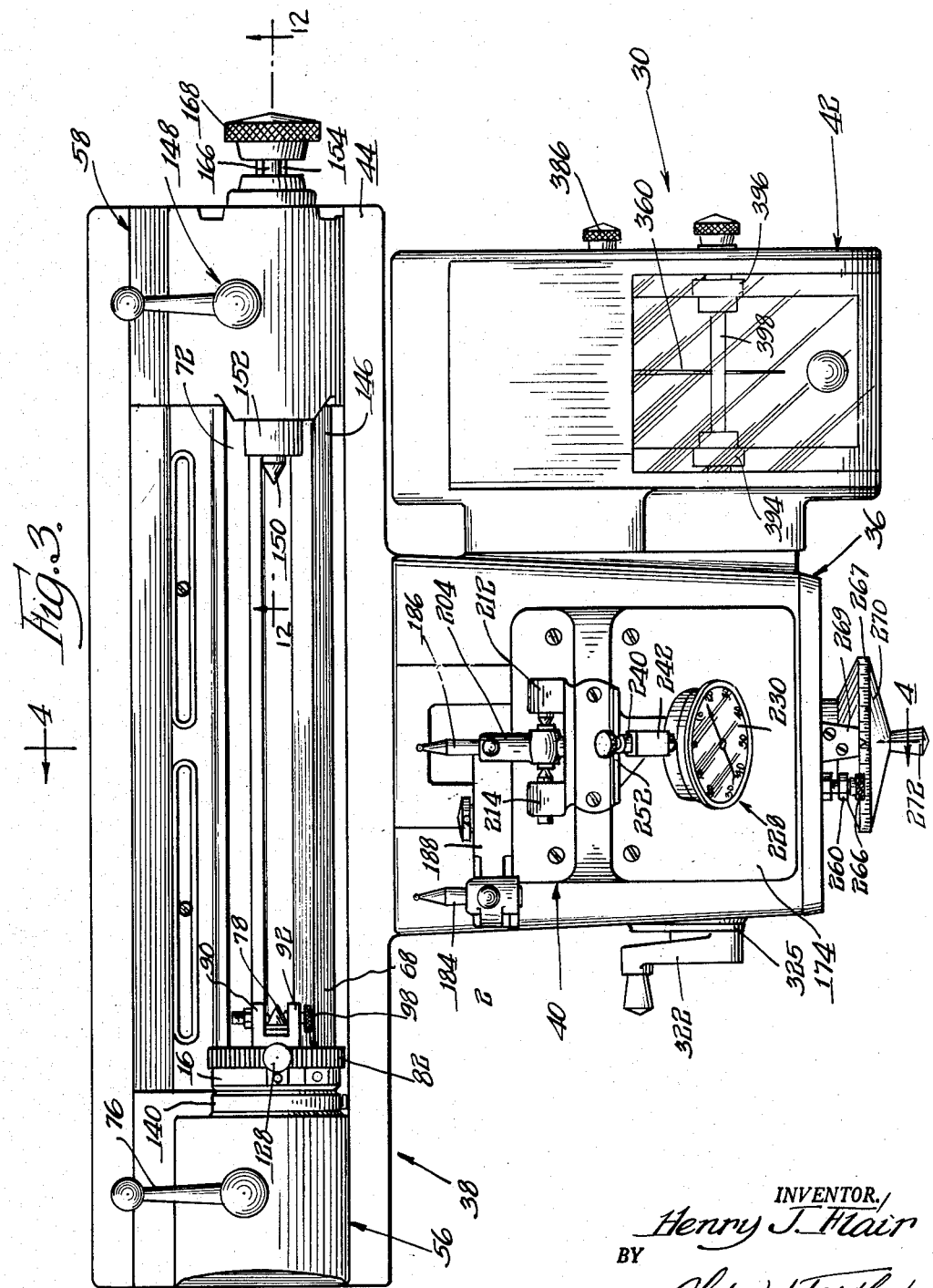

Referring now more specifically to the drawings, wherein like parts are designated by the same numerals throughout the various figures, an apparatus 30 embodying the principles of this invention is shown best in Figs. 1, 2 and 3. This apparatus includes a support or stand 32 adapted to contain an instrument and electrical panel 34. A base or housing 36 is mounted on the stand 32 by any suitable means and is adapted to support slidably a work mounting carriage 38 and an indicator slide 40 in the manner described fully hereinbelow. In addition, a recording device 42 is secured to a side of the housing 36 by suitable means.

As shown best in Figs. 1 through 5, and 9, the work mounting carriage 38 includes an elongated carriage base block 44 having a pair of longitudinally extending parallel ball races 46 and 48 secured therein by screws or other suitable means. These ball races are adapted to align with complementary ball races 50 and 52 set in the housing 36, whereby the cooperating races are adapted to retain a plurality of steel balls 54 to support the work mounting carriage for accurate movement with minimum wear. Mounted on the carriage base are a head stock 56 and a tail stock 58 which are adapted to support therebetween an arbor 60. The arbor is adapted by any suitable well known means rigidly to support thereon a work piece or gear 62 and a master element 64, which master element may be substantially similar to the work piece and accurately machined to the dimensions desired for the work piece.

Figure 4:
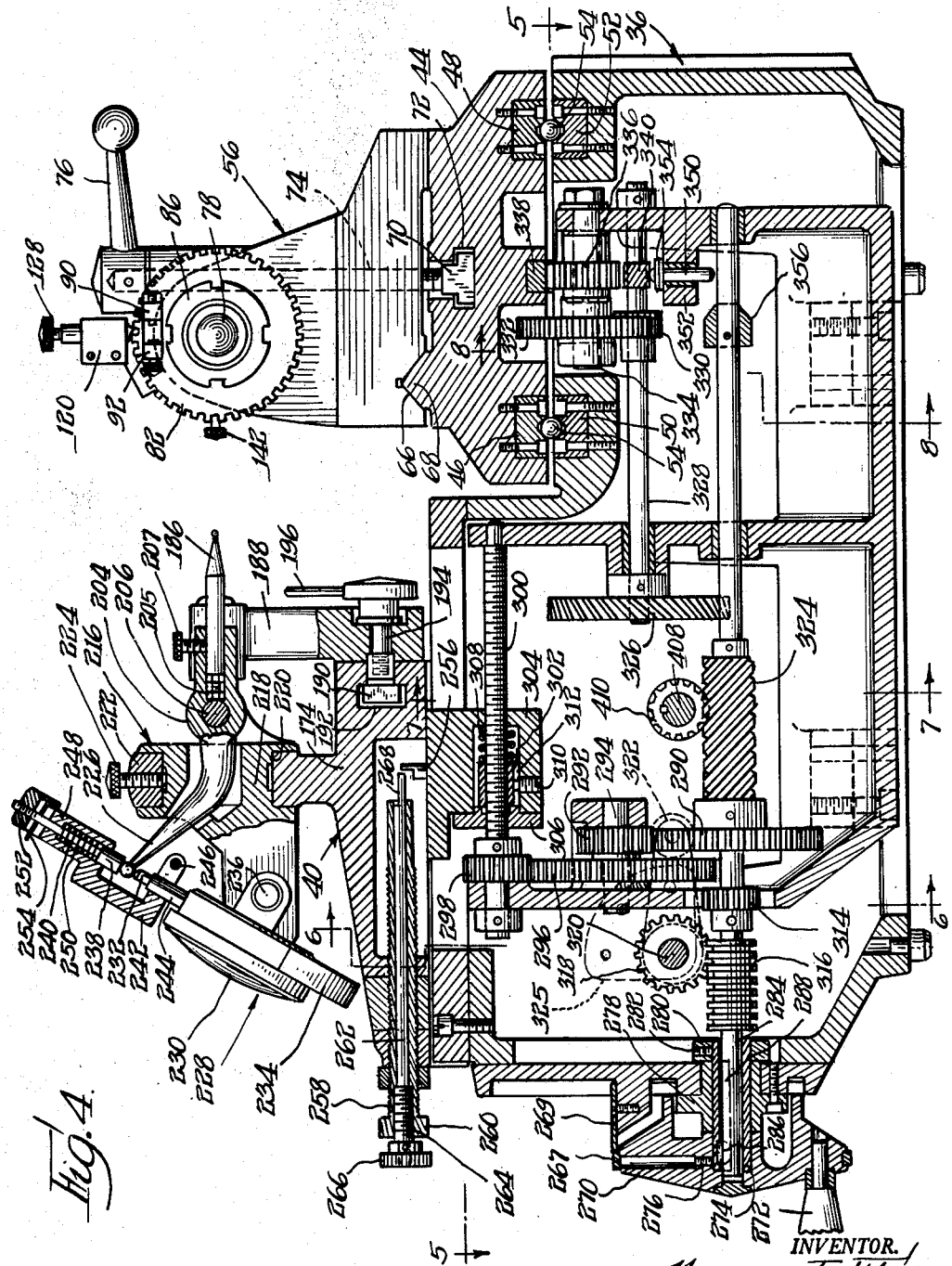
Fig. 4 is an enlarged vertical cross sectional view taken along line 4—4 in Fig. 3.
Figure 5:
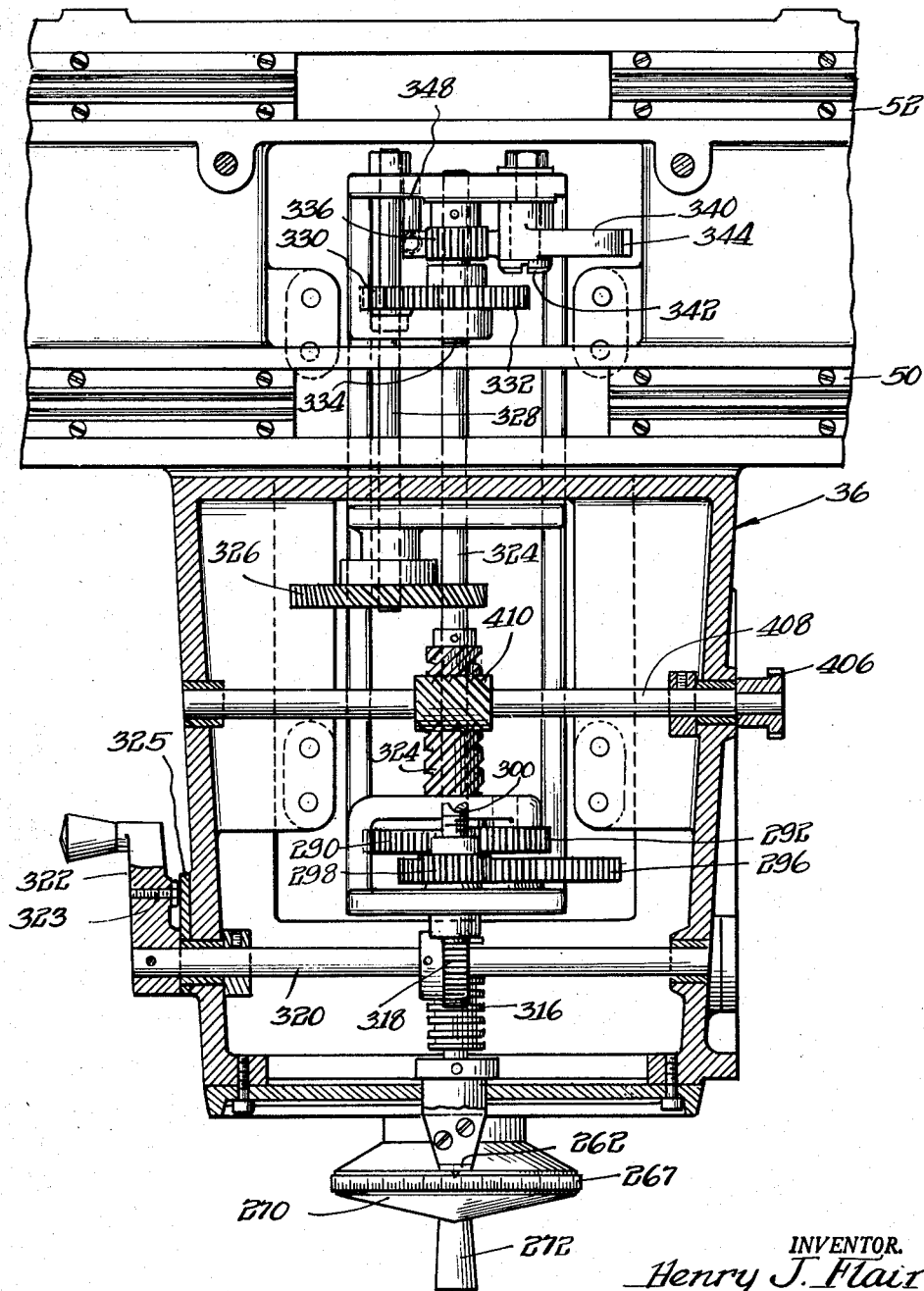
Fig. 5 is a fragmentary horizontal cross sectional view taken along line 5—5 in Fig. 4.
Figure 6:
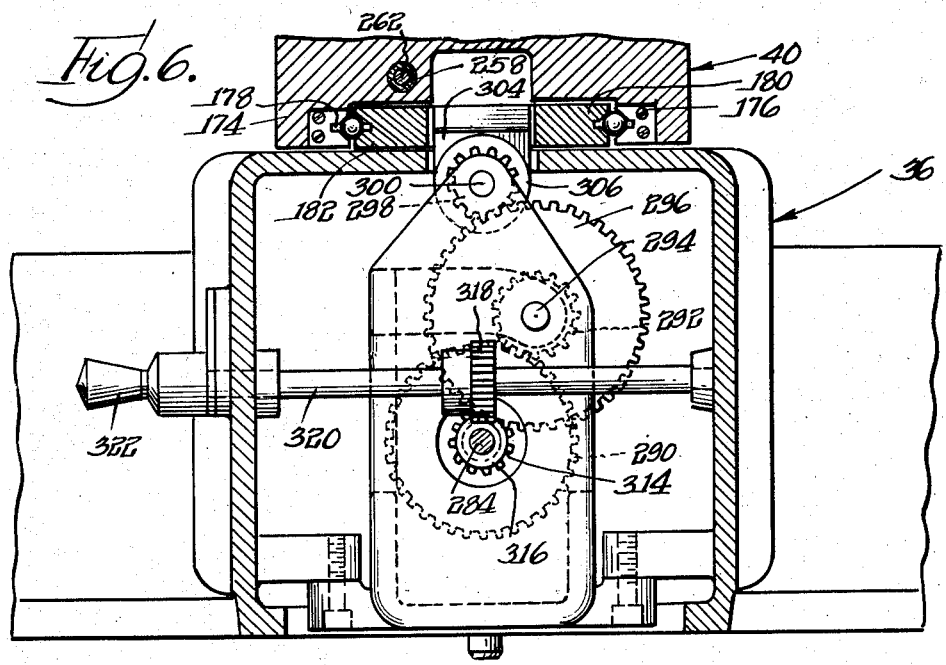
Fig. 6 is a fragmentary vertical cross sectional view taken along line 6—6 in Fig. 4.
Figures 7, 8:
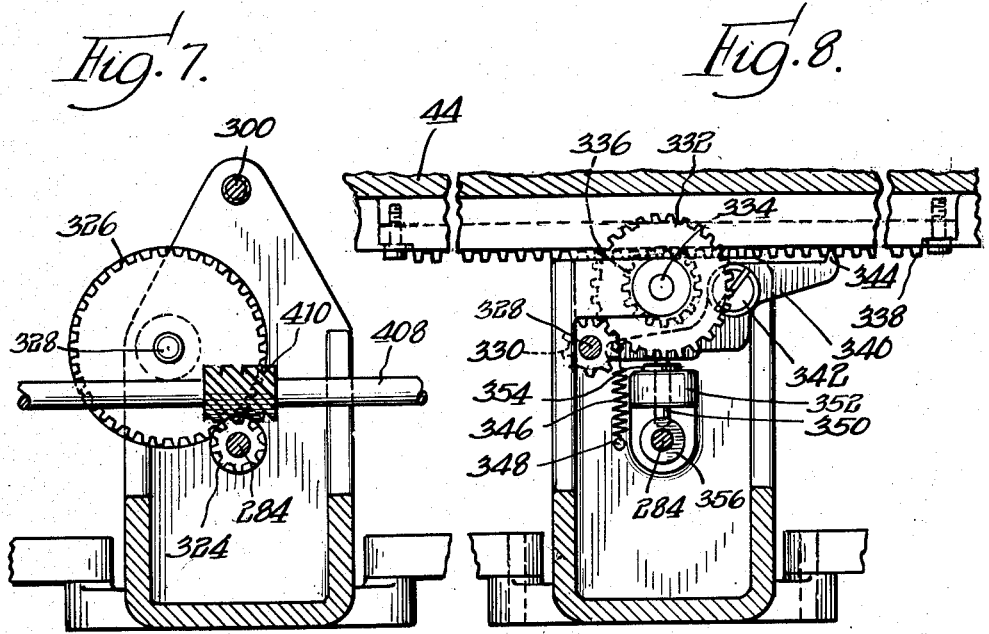
Fig. 7 is a fragmentary vertical cross sectional view taken along line 7—7 in Fig. 4.
Fig. 8 is a fragmentary vertical cross sectional view taken along line 8—8 in Fig. 4.

In order to adjust the distance between the head and tail stocks for the purpose of accommodating work supporting arbors of various lengths, both the head and tail stocks are longitudinally adjustably mounted on the carriage base 44. Referring particularly to Figs. 4 and 15, it will be seen that the head stock is provided with a V-shaped groove 66 adapted slidably to receive a similarly shaped guide 68 on the carriage base. Thus, the head stock may be accurately adjusted along the carriage base to a desired position where it is locked by suitable means. This locking means may include an inverted T-shaped block 70 slidable in a suitable T-shaped slot 72 in the base 44 and threaded on the lower end of a shaft 74 journaled in the head stock. Actuating handle means 76 is suitably secured to the upper end of the shaft 74 to rotate the shaft and draw the block 70 into clamping engagement with the base 44, thereby locking the head stock at the desired position.

As will appear from the description given hereinbelow, the work piece is inspected for errors in the various elements of lead, tooth profile, and tooth spacing by contacting the master element with a fixed feeler or inspection finger and by contacting the work piece by a movable feeler or inspection finger in a manner so that the position of the movable finger varies in accordance with any difference between the master element and work piece surfaces being compared. In accordance with a feature of this invention, means is provided in the head stock for yieldably biasing the arbor 60 so that the arbor tends to rotate in a direction to insure continuous contact between the master element and its associated inspection finger. This means is shown best in Figs. 14, 15 and 16, wherein the head stock 56 is illustrated as including a dead center 78 for supporting one end of the arbor 60, which center is mounted in a member 80 disposed in the head stock and fixed against rotation by a suitable means. An annular ratchet wheel 82 having a plurality of peripherally disposed teeth 84 is rotatably mounted on the member 80 and retained thereon by a nut 86. This ratchet wheel is rigidly and detachably connected to the arbor 60 for driving the arbor by means of a U-shaped member 88 having spaced legs 90 and 92 adapted to embrace a dog 94 rigid with the arbor. The U-shaped member 88 is, of course, rigidly secured to the ratchet wheel by suitable means such as screws, and a pair of set screws 96 and 98 are threaded through the legs 90 and 92, respectively, of the U-shaped member for securely retaining the arm 94. Preferably, at least one of the set screws is provided with an enlarged head to enable it to be easily loosened whenever it is desired to dismount the arbor.

In order to rotate the ratchet wheel and, thus, the arbor 60, a coil compression spring 100 encircles the member 80 and is operatively connected with the ratchet wheel so that when the spring is energized, it tends to rotate the ratchet wheel. As shown best in Figs. 15 and 16, the opposite ends 102 and 104 of the spring are separated by a stop member 106 extending radially outwardly from a suitable slot 108 in the fixed member 80. The stop member includes a pair of spaced radially extending arms 110 and 112 which are engageable with the end of the spring and which are spaced sufficiently to permit a pin 114 to pass therebetween. The pin 114 is disposed between the ends of the spring and is mounted in an annular housing ring 116 which encloses the spring and is rotatable with respect to the member 80. Thus, upon rotation of the ring 116, the pin 114 compresses the spring so that the ring is yieldably biased in a direction opposite to its initial direction of rotation. A bracket member 118 is secured to the ring 116 by means of screws and the like for supporting a hollow block 120. The hollow block 120 contains a dog 122 engageable with the teeth on the ratchet wheel, whereby a driving connection is provided between the ratchet wheel and the ring 116, and thus between the ratchet wheel and the spring 100. In order to permit energizing of the spring without rotating the ratchet wheel, and thus the arbor, the dog 122 is preferably slidably mounted in the hollow block by means of a shaft 124 and yieldably biased into engagement with the ratchet wheel by means of a spring 126. A knob 128 is secured to the upper end of the shaft 124 so that the dog may be easily lifted out of engagement with the ratchet wheel. In addition, a pin 130 extends transversely through the shaft 124 and is adapted to enter opposed slots 132 in the upper end of the block 120. With this structure, it is seen that by lifting and partially rotating the shaft 124, the pin 130 will engage the upper end of the block 120 so as to retain the dog out of engagement with the ratchet wheel, whereby the ratchet wheel is disconnected from the spring to permit free rotation of the arbor for any desired purpose.

The operation of the above described spring driving means is believed to be clear, but a short description is as follows. With the parts positioned as shown in Fig. 15, the knob 128 is grasped to lift the dog 122 out of engagement with the ratchet wheel and then pulled in a counterclockwise direction so that the spring is placed under compression. The knob 128 is then released to permit the dog to engage the ratchet wheel, whereby the ratchet wheel, and thus the work supporting arbor, are yieldably biased for rotation in a clockwise direction. It should be understood that the dog may be raised and rotated about its axis 180°, whereupon it may be moved in a clockwise direction to energize the spring for yieldably biasing the ratchet wheel and arbor in a counter-clockwise direction. Preferably, means are provided so that the arbor 60 may be rotated only sufficiently to index one tooth of the work piece. In the illustrated embodiment, this means includes a pin 134 mounted in the housing ring 116 and engageable with either stop pin 136 or stop pin 138 to limit movement of the ring 116, and thus the ratchet wheel and arbor. The stop pins 136 and 138 are preferably adjustably mounted to the head stock by means of a ring 140, which ring may be secured in any desired adjusted position by a set screw 142. As shown in Fig. 15, the stop pins 138 are usually positioned equal distances from opposite sides of the pin 134 when the pin is in its normal position or, in other words, when the ring 116 is in its normal position with the spring de-energized.

Referring now to Figs. 2, 9 and 12, it will be seen that the tail stock 58 is also adjustably mounted on the carriage base 44 in order to accommodate various lengths of work supporting arbors. Preferably, the tail stock is provided with a V-shaped groove 144 adapted slidably to receive a complementary shaped guide 146 on the carriage base. If desired, the guide 146 and the similar guide for the head stock may be one continuous element, as shown in Fig. 3. The tail stock may be locked in any desired position by locking means 148 which is substantially identical to the above described locking means for the head stock and, therefore, need not be described in detail.

In order to support the arbor, the tail stock is provided with a center 150 mounted in a tubular member 152 slidably disposed in the tail stock, which center may be dead or live in accordance with the torque required to rotate the arbor 60. Means are provided for retracting the tubular member 152 and the center carried thereby to permit relatively rapid mounting or dismounting of the arbor. This means includes a bell crank or lever 154 pivotally mounted by a pin 156 in the tail stock and having a tip 158 disposed in a recess 160 in the tubular member. Thus, by applying downward pressure on the lever 154, the center 150 will be retracted so as to permit removal or assembly of the arbor. The center 150 is normally yieldably biased toward an extended arbor engaging position by means of a spring 162 acting between the tubular member 152 and a cap 164 secured to the head stock by screws or other suitable means. In many instances, it is desirable to hold the center 150 in a retracted position for considerable periods of time, and this may be accomplished by a screw member 166 threaded into the member 152. The screw member 166 may be rotated by any suitable means, such as a knob 168 secured thereto, so that the member 152 and the dead center are drawn to the retracted position. While the member 152 is axially slidable, it is preferably retained against rotation, and this may be accomplished by providing the member 152 with an elongated keyway 170 adapted to receive a key 172 fixed to the tail stock housing.

The indicator or inspecting slide 40 is also slidably mounted on the housing 36 and is movable perpendicularly relative to the work piece mounting carriage 38. As will appear from the description hereinbelow, an important feature of the present invention resides in the fact that the work piece mounting carriage may be moved transversely of the indicator slide to test the element of lead in the work piece, and the indicator slide may be moved transversely of the work piece mounting carriage to test the elements of tooth profile and tooth spacing. Thus, the present invention provides a single machine for testing and measuring all three of the elements of lead, tooth profile, and tooth spacing.

Referring particularly to Figs. 1 through 4, and 9, it will be seen that the inspecting slide 40 includes a carriage member 174 having mounted therein a pair of ball races 176 and 178 which cooperate with the ball races 180 and 182 mounted on the base 36 for retaining a plurality of steel balls to support movably the slide 40. The inspecting slide carries a fixed feeler or guide finger 184 adapted to contact the master element or gear 64 and a movable feeler or inspecting finger 186 adapted to contact the work piece 62. These fingers are disposed to contact corresponding surfaces on the master element and work piece, whereby any variation in the shape of the work piece surface from that of the master element causes movement of the finger 186, which movement is indicated and recorded by the means described below. The fingers 184 and 186 are more or less conventional in structure and are provided with ball work engaging tips in the manner illustrated. As is well known, the point of contact between such ball tips and the work travels over the ball tips as the work is rotated, whereby some error is introduced into the inspecting operation even though the ball tips are accurately formed. This error may be substantially eliminated by replacing the fingers 184 and 186 with a novel finger 185, shown in Fig. 25. The finger 185 is provided with a cylindrical tip 187, a corner 189 of which always engages the work with point contact.

The finger 185 has the further advantage that the cylindrical tip may be formed more economically than a ball tip, and also the cylindrical tip may be easily sharpened merely by grinding the flat end thereof. In addition, the solid cylindrical portion 191 increases the rigidity of the finger 185.

In order to accommodate work pieces and master elements having various widths, the finger 184 is adjustably mounted by a bracket 188 for movement transversely of the slide 40. As shown best in Fig. 4, the bracket 188 is provided with clamping means for locking the bracket in the desired adjusted position similar to the clamping means described above for the head stock. Thus, the clamping means for the bracket 188 includes a T-shaped block 190 slidable in a T-shaped slot 192 in the carriage member 174 and threaded on a shaft 194 operable by handle 196. As shown in Fig. 13, the finger 184 is slidably mounted in a bore 198 in the bracket 188 for adjustment toward and away from the master element. This adjustment may be accomplished by inserting the finger 184 into the bore until it abuts a plug 200 threaded into the bracket 188, whereupon the finger is locked in position by set screw 202.

The movable finger 186 is mounted in a bell crank 204, as shown best in Fig. 4, and is also axially adjustable. This adjustment is obtained by inserting the finger 186 into a bore in the bell crank until an adjustable screw 205 threaded into the inner end of the finger abuts a central pin 206 in the bell crank, and the finger is retained in position by a set screw 207 provided for holding the finger 186 in the desired adjusted position. The bell crank 204 is mounted for pivotal movement between centers 208 and 210 which in turn are supported in spaced arms 212 and 214 of a bracket member 216. The bracket member 216 includes a hollow annular body portion 218 disposed in a semi-annular seat 220 on an upstanding flange of the carriage member 174. A cap 222 encloses the upper portion of the bracket 216 and is secured to the upstanding flange of the carriage member by suitable means, such as screws. The bracket 216 can be rotated through 360 degrees, and thus the bracket and bell crank may be retained in any desired position by means of a set screw 224 threaded through the cap member 222 in order to obtain the normal error.

In order to measure for indicating or recording purposes any movement of the finger 186, an arm 226 of the bell crank extends rearwardly through the hollow annular portion of the bracket 216 for actuating an indicating and pickup head 228. This head includes a dial indicator 230 of any conventional form which includes a spring biased plunger 232 engageable with the bell crank and actuatable thereby for moving the pointer of the dial. A linear variable differential transformer 234 is mounted on the back of the dial and is also adapted to be operated by the plunger 232. This transformer is connected with means described hereinbelow for recording the results of an inspection operation. The dial and transformer are preferably mounted to a rearwardly extending arm of the bracket 216, as at 236.

In order to provide means for initially calibrating the dial and transformer, a spring biased plunger 238 is disposed for pressing against the end of the bell crank arm 226 in a direction opposite to the plunger 232. The plunger 238 is mounted in a sleeve 240 having an enlarged split lower portion 242 which is adapted to surround a guard tube 244 for the plunger 232 and be clamped to the guard tube by a suitable screw 246. The upper end of the sleeve 240 is closed, as at 248, and a spring 250 surrounds the stem of the plunger to force the plunger against the bell crank arm. A nut-like member 252 is threaded on the upper end of the plunger 238 stem so that by turning the nut, the pressure applied to the bell crank by the plunger 238 may be varied. During such turning of the nut-like member 232, the plunger is held against rotation by means of a pin 254 extending through the stem thereof and disposed in a suitable slot in the upper end of the sleeve 240.

As will appear from the description hereinbelow, the inspecting slide is often moved back and forth several times during a given testing or inspecting operation. In many instances, it is desirable that the forward movement of the slide be stopped at exactly the same position during the testing operation, and, therefore, stop means have been provided to accomplish this result. As shown best in Fig. 4, a stepped abutment member 256 rigidly fixed with respect to the base or housing 36 is adapted to cooperate with a pair of adjustable stops on the inspecting slide to limit the forward movement of the slide. One of these stops comprises a hollow tube 258 threaded into a suitable bore in the carriage member 174 for engagement with the abutment member 256. The stop member 258 is provided with a knob 260 at its outer end to permit adjustment thereof. The second stop member includes a rod 262 disposed within the hollow tube 258 and having a threaded portion 264 cooperating with internal threads on the tube 258. A knob 266 is also provided on the outer end of the rod 262 to permit rotation thereof. It should be noted that the inner end of the rod 262 is cut away, as at 268, so that upon rotation of the rod 180° from the position illustrated, the rod will clear the upper end of the abutment 256, and the tube 258 will become the effective stop member. As will be understood, the stop 258 may be used to locate the inspecting fingers at the point of true involute face of the work piece which is located by a scale 267 mounted on an actuating hand wheel described below and cooperating with a suitable scale element 269 fixed on the housing 36. The stop 262 may be used to locate the fingers for checking tooth spacing at the pitch line or any other desirable point on the tooth.

As set forth hereinabove, in order to check the various elements of lead, tooth profile, and tooth spacing, the work piece mounting carriage and the inspecting slide are both slidably mounted, and means is provided for alternately driving either the carriage or the slide. This means is shown best in Figs. 4 through 8 and includes a hand wheel 270 disposed at the front of the housing 36 and having an operating handle 272. The hand wheel 270 is fixed to a hollow sleeve 274 by means of a set screw 276. The sleeve is rotatably mounted in the housing 36 by a suitable bearing member 278 and is restrained against axial movement forwardly of the housing by collar 280 secured to the sleeve by means of a set screw 282. An elongated drive shaft 284 is slidably received in the sleeve 274, and a key 286 slidable in an elongated slot 288 in the shaft is provided for obtaining a driving connection between the sleeve and the shaft. In order to move the inspecting slide 40, a gear 290 is rigidly fixed on the drive shaft 284 for meshing engagement with an idler gear 292 fixed on a rotatable shaft 294. Another and larger gear 296 is also rigidly fixed on the shaft 294 and is disposed for meshing engagement with a gear 298 fixed on a screw rod 300, which screw rod is rotatably supported and restrained against axial movement by suitable means. A nut member 302 is threadedly received on the screw rod and is movable therealong upon rotation of the rod. This nut member is operatively connected with the inspecting slide so that the slide moves with the nut member.

In accordance with a feature of this invention, resilient means is provided for connecting the inspecting slide with the nut member 302, which resilient means resiliently urges the slide toward the master element and the work piece, and thus cooperates with the above described spring drive means in the head stock to insure constant contact between the inspecting fingers and the master element and work piece. This resilient means is shown best in Fig. 4 and includes a block-like member 304 secured to the inspecting slide and surrounding the screw rod 300. The block-like member has an enlarged bore extending partially therethrough for slidably receiving the nut member 302. A cap member 306 is secured to the block 304 at the open end of the bore therein and is adapted to limit movement of the inspecting slide relative to the nut 302. A compression spring 308 acts between the opposite end of the nut and the closed end of the bore in the block-like member, whereby to bias yieldably the block-like member and the inspecting slide forwardly with respect to the nut. The nut 302 is retained against rotation relative to the screw rod 300 by means of a pin 310 threaded into the block 304 and slidable in an axially extending slot 312 formed in the nut.

As will be understood, the relatively large gear 290 on the drive shaft 284 will drive the inspecting slide at a relatively high speed, and this is desirable in order to save time in instances such as during checking a work piece for tooth spacing. However, when a work piece is to be checked for tooth profile, it is desirable to move the inspecting slide relatively slowly, and, therefore, a relatively small gear 314 is mounted on the drive shaft 284 and is adapted to be shifted into driving engagement with the gear 296, while at the same time, the gear 290 is shifted out of meshing engagement with the gear 292. This shifting action is attained by means of a rack-like member 316 fixed to the drive shaft 284 and having annular teeth adapted to mesh with the teeth of a shifting gear 318. The shifting gear 318 is fixed on a shaft 320 journaled in the base or housing 36, which shaft has an actuating handle 322 secured to its outer end as shown best in Figs. 1, 4 and 6. Thus, it is seen that by rotating the actuating handle 322, the drive shaft 284 may be shifted axially so as to position either the relatively large gear 290 or the relatively small gear 314 for driving engagement with the inspecting slide operating gear chain. As shown best in Fig. 5, the gear shift handle 322 may be retained in any desired shifted position by means of a pin 323 having a rounded end engageable within suitably located depressions in a plate 325 secured to the housing or base 36.

In order to check the lead of the work piece teeth, the work piece supporting carriage 38 is driven while the inspecting slide or carriage remains substantially stationary. In order to accomplish this, the shifting gear 318 is rotated to move the drive shaft 284 axially sufficiently to disengage both gears 290 and 314 from the inspecting slide gear train and to bring a worm or helical gear 324 fixed on the shaft into meshing engagement with a gear 326 of a gear train for driving the work mounting carriage. The gear 326 is fixed on a suitably journaled shaft 328, which shaft also has fixed thereon a gear 330. The gear 330 is positioned for meshing engagement with another gear 332 fixed on a shaft 334. A gear 336 is also fixed on the shaft 334 and is disposed to mesh with a rack 338 secured in the work piece mounting carriage base 44 in the manner shown best in Figs. 4 and 8. With this structure, it is seen that the main drive shaft 284 may be shifted so that the hand wheel 270 may be used to drive either the work supporting carriage or the inspecting slide.

As suggested hereinabove, the work supporting carriage is locked against movement whenever the inspecting slide is moved back and forth, as for example during tooth profie or tooth spacing inspecting operations. As illustrated best in Figs. 4, 5 and 8, means has been provided for automatically locking the work supporting carriage whenever the main drive shaft 284 is positioned to drive the inspecting slide and for automatically releasing the work supporting carriage when the main drive shaft is shifted to operate the carriage driving gear train. This means includes a lever 340 pivotally mounted intermediate its ends by a suitable pin 342. One end of the lever is provided with a finger 344 adapted to engage between the teeth of the rack 338 to lock the carriage. A spring 346 is connected between the opposite end of the lever 342 and a fixed pin 348 so that the finger 344 is normally biased into locking engagement with the rack. In order to pivot the lever 340 so as to release the rack, an actuating pin 350 is slidably mounted within a suitable lug 352 on the machine base and is positioned for engagement with the lever. The pin 350 is provided with a flange or washer 354 rigid therewith to limit downward movement thereof. As shown best in Fig. 8, the pin 350 is positioned so that upon upward movement thereof, the lever 340 will be rotated so as to release the rack. This upward movement of the pin is obtained by means of a cam 356 rigidly fixed on the main drive shaft 284 and positioned to engage and raise the pin 350 when the drive shaft is shifted to bring the worm 324 into driving engagement with the gear 326. It is obvious that when the main drive shaft is shifted back to disengage the worm and gear, the cam 356 will also disengage from the pin, and the spring 346 will rotate the lever to lock the work supporting carriage.

The recording device 42 is shown best in Figs. 1, 2, 3, and 17 through 19 and includes a casing 358 adapted to be secured to the housing or base 36 by screws or other suitable means. A marking element or inking pen 360 is supported within the housing and is connected with and operated by suitable motor means 362. The inking pen and its operating motor may be of any conventional design commercially available and, therefore, need not be described in detail. The inking pen is adapted to mark a strip 364 of suitable chart paper to provide a record of the various testing operations which may be easily read and analyzed by the operator. The strip of paper is fed from a roll 366 which is supported on an axle 368 between a pair of pivotally mounted arms 370 and 372 having slots adapted to receive the axle. The arms are normally retained in a raised position by means of a spring 374, but may be easily pivoted downwardly against the action of spring to permit loading of a new roll of paper. During such loading of the paper or at any other desired time, the pen 360 may be raised to an inoperative position by means of a bar 376 supported between arms 378 and 380 mounted on the rotatable shaft 382. The shaft 382 is journaled in the side of the casing 358, as at 384, and is provided with a knob 386 on its outer end to facilitate rotation thereof.

The chart paper 364 is directed from the roll over a table 388 and beneath a pair of guide members 390 and 392. The paper is fed past the pen by a pair of resilient or rubber feed rolls 394 and 396 fixed on a shaft 398 journaled in the housing 358. In order to feed the paper at a rate proportional to the rate of movement of either the inspecting slide or the work supporting carriage, drive means is provided for connecting the shaft 398 with the above described hand wheel 270. This drive means includes a gear 400 fixed to an end of the shaft 398 and disposed for meshing engagement with an idler gear 402 rotatably mounted on a pin 404 secured to the casing 358 (see Figs. 17 and 19). The idler gear 402 is driven by a gear 406 secured to a shaft 408 journaled in the main housing 36. As shown best in Figs. 4, 5 and 7, the shaft 408 also rigidly carries a gear 410 disposed for meshing engagement with the worm 324 on the main drive shaft 284. Thus, it is seen that upon rotation of the hand wheel 270, the chart paper will be fed in time with the movement of either the inspecting slide or the work supporting carriage. Since, however, the carriages must be moved back and forth between inspecting operations for individual teeth, means is provided for disconnecting the paper drive means during reverse movement of the carriages so that the paper is fed forwardly only upon movement of the carriages in one direction. This means in the illustrated apparatus includes a one way clutch 411, see Figs. 17 and 19, of any conventional form disposed to connect the shaft 398 and the gear 400. Conveniently, this clutch may be of the type having usually a cam wheel rotatably disposed within a housing with a plurality of balls arranged within the housing so as to be jammed between the cam wheel and the housing to provide a driving connection only when the cam wheel is rotated in one direction.

Figure 24:
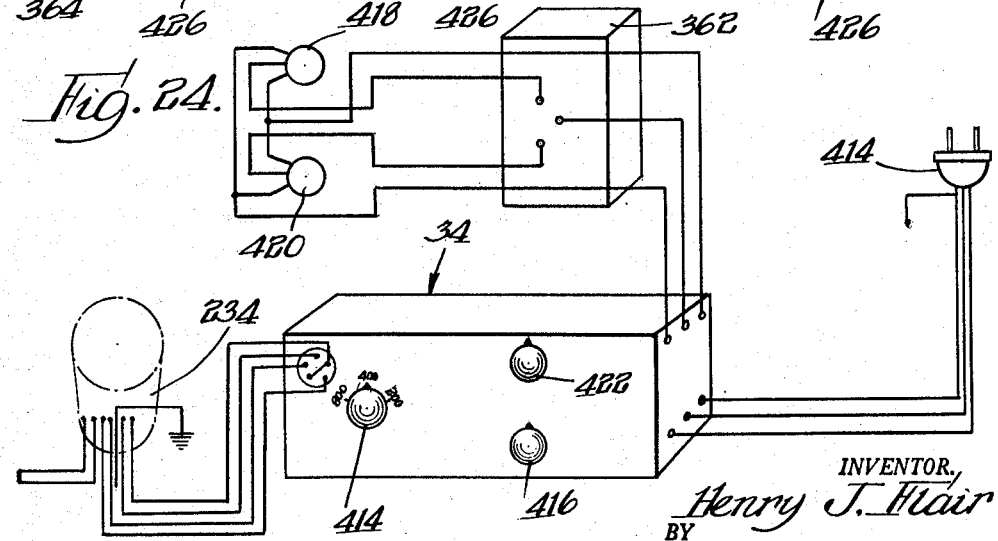
Fig. 24 is a diagrammatic illustration of the testing or inspecting apparatus electrical circuit.

It is, of course, understood that suitable electric means is provided for connecting the pickup transformer 234 on the inspecting slide and the pen actuating motor so that the pen will be moved in accordance with any variation of the shape of the work piece surface from that of the master element surface. Such elecrtic means is diagrammatically illustrated in Fig. 24, and includes a control box or panel 34 containing an amplifier and suitable control devices, which control box may be connected with a source of electric power by suitable plug means 414 and is also connected with the transformer 234 in the manner illustrated. The control box 34 also contains suitable means for adjusting the amplification of the signals from the transformer, which means is controlled by an attenuator knob 414 and calibration means controlled by a gain knob 416. A pair of potentiometers 418 and 420 are also disposed within the control box and may be adjusted by a zero knob 422. The pen actuating motor 362 is connected with the control box and potentiometers in a well known manner so that the magnitude of pen movement may be adjusted so as to be proportional to the movement of the transformer actuating plunger.

Before using the apparatus to test a work piece, it is, of course, necessary to calibrate the indicating and recording devices. In the illustrated embodiment, the chart paper is provided with a plurality of equally spaced lines 424 with one of these lines indicated at 426 being relative heavy and providing a zero point on the paper. The lines are spaced from each other to indicate, for example, .0002 inch error when the amplifier is adjusted to provide amplification of 400:1. To calibrate the apparatus, the attenuator knob is adjusted to provide an amplification of 400:1 and the calibrating knob 252 is turned until the plunger 238 reaches the lower limit of its movement. The pen is then set on the zero line 426 by adjusting the zero control knob 422. The calibrating knob 252 is then reversely rotated so that the pointer of the indicator 230 moves in increments of 1/1000 of an inch and the gain knob is adjusted so that the pen moves from one line to another on the chart paper for every 1/1000 inch movement of the dial indicator. With the apparatus calibrated in this manner, it is ready to check or inspect one side of a tooth space on the work piece. Conveniently, the zero line 426 for checking this side of the work tooth space may be positioned toward one side of the chart paper, as illustrated best in Figs. 3 and 17, and another zero line 428 may be provided adjacent the opposite side of the chart paper for checking the other side of the tooth space.

Figure 21:
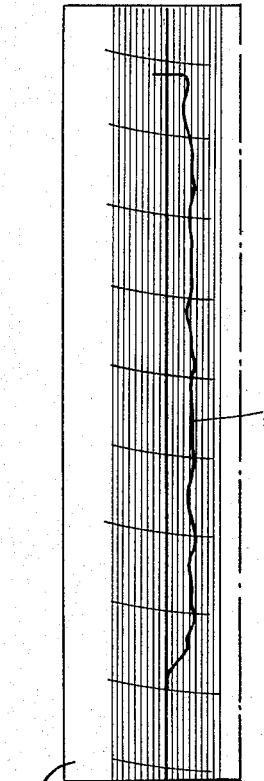
Figs. 21 and 22 show typical tooth profile and tooth spacing charts produced by the apparatus of this invention.

In order to check the profile of a work piece tooth, the apparatus is first calibrated in the above described manner. The gear shift handle 322 is then actuated to bring the relatively small driving gear 314 into meshing engagement with the inspecting slide gear chain. The hand wheel 270 is then operated to advance the inspecting slide toward the master element and work piece, and the stops 258 and 262 are set to permit advancement of the slide until the inspecting fingers 184 and 186 contact substantially the roots of the master element and the work piece teeth, respectively. The pen is then lowered to the chart paper, and the hand wheel is reversely rotated so that the inspecting fingers move from the roots to the tips of the teeth, and the chart paper is fed past the pen. It is, of course, understood that the spring drive means in the head stock has been energized so that the master element is resiliently rotated into engagement with the fixed inspecting finger. This in combination with the spring 308 resiliently urging the inspecting slide toward the master element assures continuous contact between the rigid inspecting finger and the master element. As the inspecting slide is moved rearwardly, the rigid finger moves across the profile of the master element tooth, and the movable inspecting finger 186 similarly moves across the profile of the work piece tooth. The spring biased plunger 232 in the indicator head causes the movable inspecting finger continuously to contact the lower side work piece tooth space, whereby the finger 186 moves to detect any variation in the shape of the work piece profile from that of the master element. This movement is imparted to the indicator plunger 232 which actuates the transformer 234 to create a signal for operating the inking pen. With the small gear 314 disposed to drive the inspecting slide, a relatively long length of chart paper is moved past the inking pen while the inspecting fingers move across the teeth profiles, whereby a chart similar to the typical chart illustrated in Fig. 21 will be produced with an inked line 430 showing the difference of the work piece tooth profile from the profile of the master element tooth. It is, of course, understood that in the event the work piece tooth profile coincides exactly with the master element, the pen would draw a straight line coinciding with the zero line 426.

Figure 22:
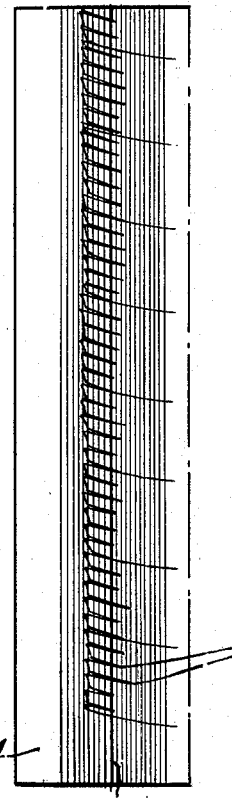

When checking tooth spacing, the apparatus is calibrated as set forth above, and the stop 262 is adjusted so that the indicator fingers will contact the teeth at the pitch circle or any other desired point. In order to save time, the gear shift is operated to bring the large gear 290 into meshing engagement with the inspecting slide gear train, whereby the slide may be moved relatively rapidly. The slide is then moved inwardly until it is arrested by the stop 262 and the spring drive means in the head stock is energized to rotate yieldably the arbor 60 and the master and work piece gears thereon into engagement with the inspecting fingers. The inspecting slide is then withdrawn so that the fingers disengage from the master and work piece gears, whereby the gears will index one tooth space under the control of the spring drive means in the head stock. Since the inspecting slide is moved relatively rapidly during this operation, a relatively short length of chart paper is fed past the inking pen, and a chart similar to the typical tooth spacing chart shown in Fig. 22 will be formed. In this chart, the deviation of the high sweep of the pen from the zero line 426, as at points 432, shows the difference between the spacing of the work piece tooth and the master gear tooth.

Figure 23:
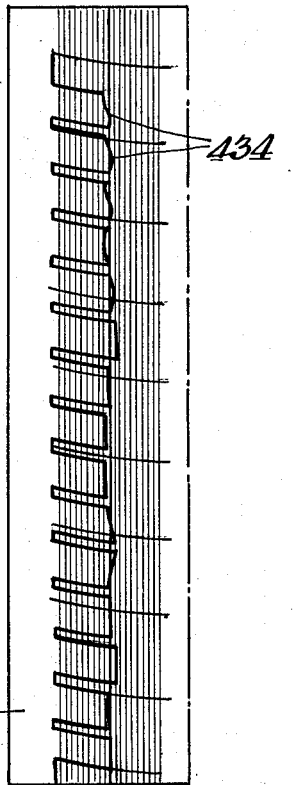
Fig. 23 shows a typical combined tooth profile and tooth spacing chart formed by the apparatus of this invention.

In many instances, the results of the tooth spacing operation are misleading when the space check is taken at a single point on the work piece teeth since local errors in the involute profile of a tooth will show up in the tooth spacing chart as an error in the tooth spacing. In accordance with a feature of this invention, the present apparatus may be utilized to check tooth spacing over the entire tooth profile, whereby any local errors in the profile may be readily determined and discounted when analyzing the work piece gear for correct tooth spacing. This is done by combining the profile and tooth space checking operations described above. Thus, the stop 262 is set to permit the inspecting fingers to contact the roots of the teeth while at the same time, the inspecting slide is operated as if a space checking operation were being conducted. This results in a chart similar to that shown in Fig. 23 being formed which in effect includes a plurality of relatively short inked lines 434 which are similar to the relatively long inked line 430 shown in the profile chart of Fig. 21. The chart of Fig. 23 readily reveals the magnitude of the error in tooth profile position or spacing as compared to the master element and also enables the operator to analyze the effect of local errors of tooth profile on tooth spacing.

When it is desired to check the lead of a helical gear, the inspecting slide stops are first set to permit the fingers to contact the work piece and master element teeth at desired points such as at the pitch line. The inspecting slide is then advanced to the work piece and master element, whereupon the gear shift lever 322 is operated to bring the worm 324 into engagement with the work piece mounting carriage driving gear train. At the same time, the carriage locking mechanism is disconnected in the manner described above to permit the carriage to be moved axially. The spring drive means in the head stock is energized to rotate the master element into yielding engagement with the finger 184, and the hand wheel 270 is operated so that the work mounting carriage carries the master element and work piece transversely past the inspecting fingers. At the same time, the chart paper is fed past the inking pen, and any variation between the lead of the work piece and master element will be recorded as will be understood. It is believed to be readily apparent that the present invention may be utilized not only to check the lead of helical gears, but also to check desired deviations such as crowning in the axial shape of gear teeth or to check the axial shape of spur gear teeth for parallelism with the gear axis.

While the method for checking only the lower side of a work piece tooth space has been given above, another important advantage of the present machine is that both sides of the tooth space may be checked without removing the work piece and turning it around. This may be accomplished simply by energizing the spring drive means in the head stock to rotate the master and work piece gear mounting arbor in the opposite direction and the pressure of the movable inspecting finger so that the opposite or upper side of the tooth space will engage the inspecting fingers. In order to energize the spring drive means in the opposite direction, it is only necessary to turn the dog 122 of the spring drive means 180° from the position shown in Fig. 15, whereupon the dog is adapted to drive the ratchet wheel in a counterclockwise direction when viewing the apparatus as shown in Fig. 15. The pressure of the movable inspection finger is reversed by rotating the knob 252 to permit the plunger 238 to be biased by the spring 240 into engagement with the bell crank arm 226. The spring 240 which is energized about twice the amount of the resistant force biasing the plunger 232 so that the spring 240 overcomes the plunger 232 and holds the knob against the bracket 248.

From the above description, it is seen that the present invention has provided a relatively simple and compact apparatus for checking or inspecting gears and the like for errors in the elements of lead, tooth profile, and tooth spacing. It is also seen that the present apparatus has provided novel means, whereby a true indication of tooth spacing may be obtained by combining the elements of tooth profile and tooth spacing in a single chart so that any local errors in the tooth profile may be readily determined. Furthermore, it is seen that the present invention has provided novel means for yieldably maintaining continuous contact between the inspecting fingers and the tooth surfaces being compared, whereby the checking or inspecting operations may be conducted relatively rapidly and with great accuracy. It will also be appreciated that another advantage of the apparatus described above will be found in the fact that means has been provided for moving the inspecting slide relatively slowly when it is desired to inspect teeth individually for tooth profile and to move the slide or carriage relatively rapidly when it is desired to check all of the work piece teeth for spacing, or when it is desired to combine the profile and tooth spacing checking operations.

While the preferred form of the present invention has been illustrated and described herein, it is obvious that many details may be altered without departing from the spirit and scope of the appended claims.

The invention is claimed as follows:

1. An inspection apparatus for work members, such as gears and the like, comprising means for rotatably supporting a master member and a work member having 1. similar surfaces to be compared, comparing means engageable with said surfaces of supported master and work members and movable toward and away from said master and work members, means yieldably biasing said comparing means toward the supported master and work members to facilitate proper engagement of the comparing means with the master and work members, and drive means comprising a single drive member and second mechanisms selectively connectable with said drive member for selectively relatively moving said comparing means and said members axially of said members and transversely of said members for comparing the surfaces as to lead, profile, and spacing.

2. An inspection apparatus for work members, such as gears and the like, comprising means for rotatably supporting a master member and a work member having similar surfaces to be compared, comparing means engageable with said surfaces of mounted master and work members, drive means for moving said comparing means and said members relatively toward and away from each other at a first relatively slow speed for comparing the surfaces as to profile, and drive means including mechanism in addition to said first mentioned drive means for moving said comparing means and said members relatively toward and away from each other at a second speed which is faster than said first speed for comparing said surfaces as to spacing, said last mentioned means facilitating relatively rapid comparison of the surfaces for spacing.

3. An inspection apparatus for work members, such as gears and the like, comprising means for rotatably mounting a master member and a work member having similar surfaces to be compared, comparing means engageable with said surfaces of mounted master and work members, means for yieldably rotatably biasing said mounted master and work members for continuous engagement with the comparing means and for automatically indexing a predetermined number of work member surfaces, drive means for moving said comparing means and said members relatively toward and away from each other at a first relatively slow speed for comparing said surfaces as to profile, and drive means including mechanism in addition to said first mentioned drive means for moving said comparing means and members relative to each other and at a second speed substantially faster than said first speed for comparing said surfaces as to spacing.

4. The apparatus set forth in claim 1 including means yieldably and rotatably biasing the master and work members into engagement with the comparing means.

5. The apparatus set forth in claim 1 including means for yieldably biasing the supported master and work members for contact with the comparing means and for automatically indexing a predetermined number of work member surfaces after one work member surface has been inspected and disengagement of said comparing means from said surfaces has been accomplished.

6. The apparatus set forth in claim 1 wherein the master and work members are mounted on a first movable carriage and the comparing means is mounted on a second movable carriage.

7. The apparatus set forth in claim 6 wherein the first and second carriages are relatively movable one to the other in a plurality of directions.

8. The apparatus set forth in claim 6 wherein said comparing means is characterized by a fixed and a movable element engageable respectively with the surfaces of said master and work members, said drive means moves one of said carriage means relative to the other of said carriage means for moving said comparing means and said master and work members axially of said members and transversely of said members, and stop means is associated with one of said carriage means for limiting movement thereof to afford a limited engagement of said fixed and movable elements of said comparing means with predetermined surface areas of said master and work members.

9. An inspection apparatus, as defined in claim 8, which includes means for locking the master and work member supporting carriage means against movement while the other carriage means is moved for comparing the surfaces as to profile and spacing.

10. An inspection apparatus, as defined in claim 8, which includes electrical transformer means operable by said movable element of the comparing means and adapted to be operatively connected with a recording device so that any movement of said movable element relative to said fixed element will be shown by the recording device.

11. A method of inspecting work pieces, such as gears and the like, comprising rotatably supporting a master member and a work member having surfaces to be compared, engaging the surfaces of the master and work members with elements of a comparing mechanism, and moving said master and work members and said elements relative to each other and transversely of the axis of rotation of said members at first and second relatively fast and slow speeds for inspecting the work member surfaces as to profile and for contemporaneously inspecting the work member surfaces as to profile and spacing.

12. A method of inspecting work pieces, such as gears and the like, comprising rotatably supporting a master member and a work member having circumferentially spaced surfaces to be compared, successively engaging the surfaces of the master and work members with elements of a comparing mechanism, successively moving said master and work members and said elements relative to each other and transversely of an axis of rotation of said members at first and second relatively fast and slow speeds for inspecting the work surfaces engaged by one of said elements as to profile and for contemporaneously inspecting the work member surfaces successively engaged by one of said elements as to profile and spacing, moving a strip of chart paper and the like past a recording device in accordance with the relative movement between said members and said elements for recording a series of relatively long lines on the moving chart paper to indicate any variation between the master and work member surfaces as to profile and for recording a series of relatively short lines on the moving chart paper to indicate any variation between the master and work member surfaces resulting from combined errors as to profile and spacing.

13. An inspection apparatus for work members such as gears and the like comprising first means for supporting a master member and a work member having similar surfaces to be compared, comparing means engageable with surfaces of the supported master and work members, a recording mechanism disposed adjacent the heretofore mentioned means and including a marking device and chart paper feeding means for advancing chart paper past the marking device, and drive means for relatively moving said comparing means and said members transversely of said members and for actuating said feeding means for advancing chart paper, said drive means including first and second selectively operable mechanisms respectively for relatively transversely moving said comparing means and said members at a first rate having a first magnitude with respect to a predetermined rate of movement of said paper feeding means and a second rate having a second higher magnitude relative to said predetermined rate of movement of said paper feeding means for selectively comparing said surfaces as to profile and contemporaneously as to profile and spacing.

14. An apparatus, as defined in claim 13, wherein said drive means includes another selectively operable mechanism for relatively moving said comparing means and said members axially of said members and in timed relationship with said paper feeding means for inspecting said surfaces as to lead.

(References on following page)

References Cited in the file of this patent

UNITED STATES PATENTS

| | | | |
|---|---|---|---|
| Re. 22,953 | Praeg | Dec. 23, | 1947 |
| 1,254,062 | Olson | Jan. 22, | 1918 |
| 1,463,580 | Harter | July 31, | 1923 |
| 1,961,663 | Goulder | June 5, | 1934 |
| 1,969,837 | Earl | Aug. 14, | 1934 |
| 2,025,215 | Mann | Dec. 24, | 1935 |
| 2,108,414 | Schurr | Feb. 15, | 1938 |
| 2,261,093 | Poupitch | Oct. 28, | 1941 |
| 2,309,142 | Stafford | Jan. 26, | 1943 |
| 2,321,903 | Fox | June 15, | 1943 |
| 2,336,845 | Christensen | Dec. 14, | 1943 |
| 2,406,043 | Sorensen | Aug. 20, | 1946 |
| 2,432,336 | Peters | Dec. 9, | 1947 |
| 2,433,421 | Bowness | Dec. 30, | 1947 |
| 2,509,185 | Eckel | May 23, | 1950 |
| 2,612,701 | Razor | Oct. 7, | 1952 |
| 2,623,293 | Nebesar | Dec. 30, | 1952 |
| 2,652,665 | Jessup | Sept. 22, | 1953 |
| 2,659,158 | Cobb | Nov. 17, | 1953 |
| 2,664,641 | Parnet | Jan. 5, | 1954 |
| 2,810,965 | Beam | Oct. 29, | 1957 |